Patented Apr. 29, 1924.

1,491,998

UNITED STATES PATENT OFFICE.

THOMAS MIDGLEY, JR., OF DAYTON, OHIO, ASSIGNOR, BY MESNE ASSIGNMENTS, TO GENERAL MOTORS RESEARCH CORPORATION, OF DAYTON, OHIO, A CORPORATION OF DELAWARE.

MOTOR FUEL.

No Drawing.    Application filed October 4, 1918. Serial No. 256,874.

*To all whom it may concern:*

Be it known that I, THOMAS MIDGLEY, Jr., a citizen of the United States of America, residing at Dayton, county of Montgomery, State of Ohio, have invented certain new and useful Improvements in Motor Fuel, of which the following is a full, clear, and exact description.

This invention relates to fuels and more particularly to a fuel for use in super-duty internal-combustion engines.

The principal object of the invention is to provide a fuel adapted for use in super-duty internal-combustion engines, without the development of objectionable characteristics, and tending to greatly increase the effective operation of the engine. Other objects and advantages of the present invention will be apparent from the following description thereof.

As set forth in applicant's copending application, filed Oct. 4, 1918, Serial No. 256,873, the erroneous conceptions heretofore prevailing that engine knock was caused by "prematuring" or "preignition" had made the development of an engine, of the four cycle or two cycle type, adapted to operate at high compressions, a seeming impossibility. The highest compressions heretofore attained in engines of this type have been in engines adapted for aviation work, such engines being built to operate, at the earth's surface, at compressions of substantially 125 pounds per square inch. And at these compressions, with the fuels heretofore available, it has been impossible to run the engines at the earth's suface with an advanced spark since there is a knocking of the engine when run even with a retarded spark, and a highly deleterious knocking when run with an advanced spark. Because of having to run the engine with a retarded spark it has not been practicable to attain high engine speeds at the earth's surface and at low altitudes.

The desirability of having as high a compression as practicable while operating at the earth's surface and at low altitudes is quite obvious, for as higher altitudes are attained, with corresponding decreases in the compressions within the cylinder resulting from the rarefied atmosphere existing at these higher altitudes, the power output of the engine will be considerably decreased. Any increase in compression at the earth's surface therefore results not only in more efficient operation at lower altitudes but also in increased power output, and more efficient operation, at higher altitudes. And the increase at higher altitudes due to higher compression is relatively greater than the increase at lower altitudes.

A fuel such as cyclohexane, which is described in my copending application above referred to, is capable of permitting the use of high compressions at lower altitudes without the development of the knock. Cyclohexane, however, is not capable of general use as a fuel because of its comparatively high freezing point. The freezing point of this fuel is approximately the same as that of water (0° C.) and it is obvious, therefore, that it is not adapted for general aviation use inasmuch as airplanes frequently attain altitudes at which the temperature is well below its freezing point. And the same thing would be true of the use of cyclohexane as a fuel at the earth's surface. That is to say, it would not be a useful fuel when subjected to temperatures substantially below its freezing point.

The fuel forming the subject matter of this invention is one which has all the desirable characteristics of the fuel described in my copending application above referred to, namely; high heat value; high critical compression; clean burning characteristics (including non-polymerization); high power output; small distillation range; low flash point; low end point; small viscosity variation and noncorroding characteristics. In addition the fuel of the present invention has a freezing point substantially below 0° C. and sufficiently low to permit of its use under and conditions normally met with either in operation at the earth's surface or in operation, as with airplane engines, at higher altitudes.

As set forth in my copending application fuels of the naphthene group, such as cyclohexane, have the clean burning characteristics, the high heat value and the high critical compression which make them capable of use in a super-duty engine at extremely high compressions say of 125 pounds and over without the development of the knock. I have found that if compounds of this character have added thereto substantial amounts of certain of the cyclic aromatic compounds the resulting mixture retains the desirable characteristics of the compounds of the naphthene group and in addition has a freezing point substantially below the freezing point of such naphthene. In the preparation of such a fuel heretofore I have preferably made use of a mixture of cyclohexane and benzene, but other mixtures may be used if desired, for example methyl cyclohexane, a member of the naphthene group may be used as a substitute for cyclohexane, and toluene, one of the cyclic aromatic compounds, may be used as a substitute for benzene. Benzene, as is well known, is deficient in heat value as compared to gasoline, and also has the undesirable characteristic of liberating copious quantities of fluffy carbon deposit upon burning. In addition to these undesirable characteristics its freezing point is also high, being approximately the same as the freezing point of water. I have found that when benzene is mixed with cyclohexane within a certain range of proportions the resulting mixture displays all of the desirable characteristics present in the cyclohexane, and that, in addition, the mixture has a freezing point lower than the freezing point of either of its constituents. By varying the proportions of benzene and cyclohexane the freezing point of the mixture may be varied.

So that there is produced a fuel mixture which has the desirable characteristics of cyclohexane, namely, a heat value substantially higher than that of benzene, a high critical compression, is clean burning, and in addition, has a freezing point substantially below 0° C.

In adding benzene to cyclohexane increasing the proportion of benzene decreases the freezing point until a certain definite proportion is reached after which further increasing the proportion of benzene raises the freezing point. In other words starting with 100% cyclohexane the freezing point, naturally, is the freezing point of this particular compound. If now benzene is added to the cyclohexane in increasing proportions the freezing point will continue to fall until the mixture comprises substantially 80% cyclohexane and 20% benzene, by volume. When this proportion is reached the freezing point will be substantially −40° Fahrenheit or centigrade. Any further increase in benzene beyond this point causes the freezing point to rise until, where a fuel containing 100% benzene and no cyclohexane is reached, the freezing point will be the freezing point of such benzene. In other words in combining benzene and cyclohexane there is a certain definite proportion which constitutes a eutectic of those two, variations in proportion from this eutectic causing a rising of the freezing point of the mixture.

It will thus be seen that the mixing of the cyclohexane with the benzene has a double effect of reducing the freezing point and at the same time abolishing the above described undesirable characteristics of the benzene; yet to secure this double effect, the proportions of the two ingredients would have to be within the certain range of proportions. That is, if there were a great excess or too much of the benzene, its undesirable characteristics would still be present in the mixture. But over a substantial range of proportions of the two ingredients, the cyclohexane when mixed with the benzene results in a mixture which has all of the desirable characteristics present in cyclohexane and likewise has a freezing point lower than either of the constituents.

I prefer to use as a fuel, especially for the operation of airplane engines, this eutectic of cyclohexane and benzene, but it is quite obvious that where it is not necessary to use a fuel having such a low freezing point the proportions of cyclohexane and benzene can be varied as desired in order to secure the cheapest fuel which is satisfactory under the conditions desired. And of course variations in the price of cyclohexane and benzene might readily make a mixture other than the eutectic quite desirable from the point of view of costs.

While I have described this improved fuel as being composed of cyclohexane and benzene it is to be understood that I by no means limit myself to these specific constituents, inasmuch as other constituents of the naphthene and aromatic groups might be combined to produce a fuel having the same desirable characteristics, all coming within the scope of the appended claims.

1. A fuel for internal combustion engines of the character described; consisting of a eutectic mixture of cyclohexane and benzene.

2. A fuel for internal combustion engines of the character described; consisting of substantially 80% cyclohexane and 20% benzene.

3. A fuel for internal combustion engines of the character described, comprising a mixture of cyclohexane and benzene having a certain range of proportions such that the mixture preserves the cyclohexane characteristics of heat value substantially higher than that of benzene, high critical compression and clean burning, unaffected as such by the benzene, but at the same time such proportions lower the freezing point of the mixture beyond the freezing point of either constituent.

In testimony whereof I affix my signature.

THOMAS MIDGLEY, JR.

Witnesses:
J. W. WRIGHT,
GEO. ROBINSON.